UNITED STATES PATENT OFFICE.

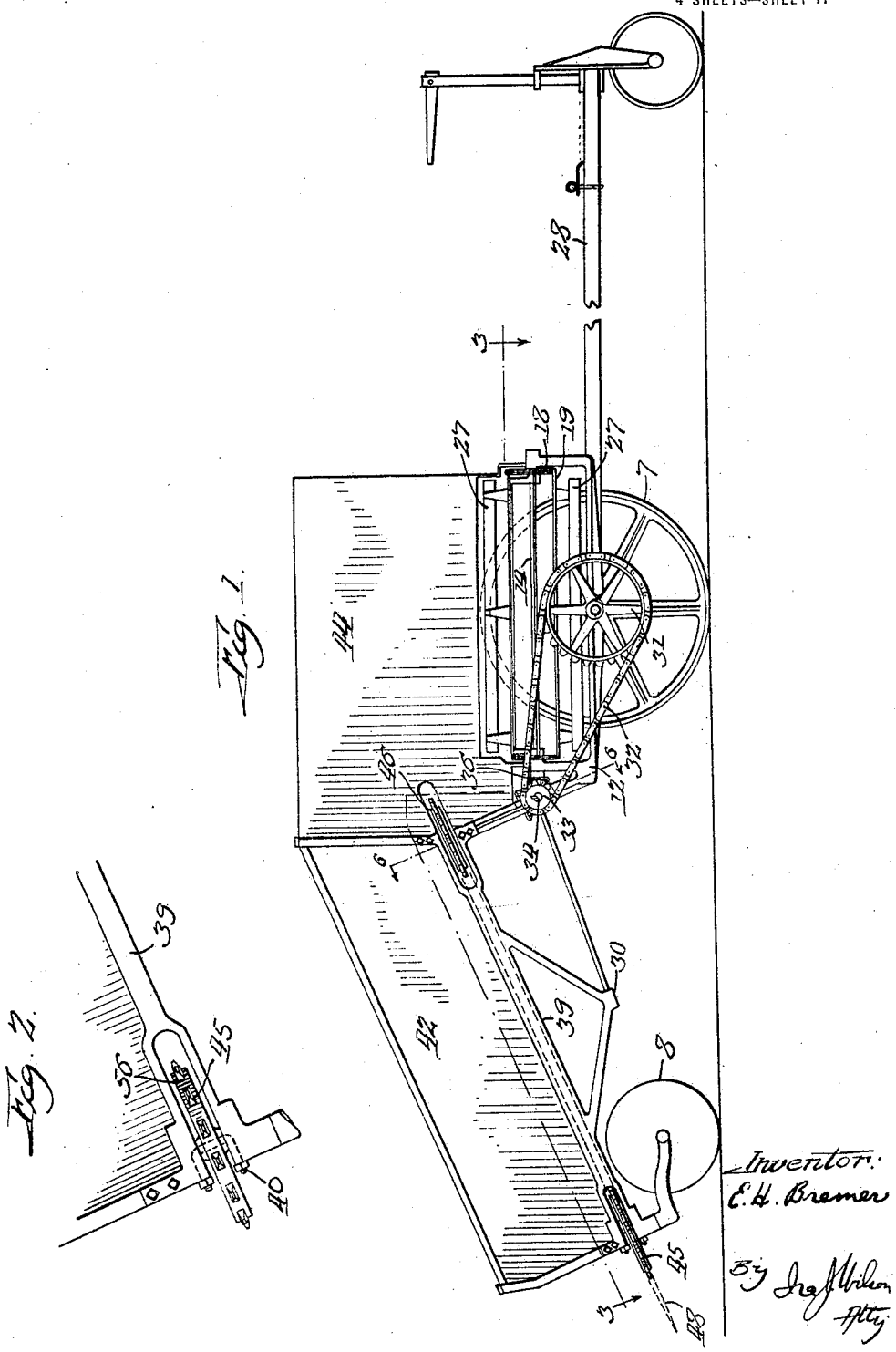

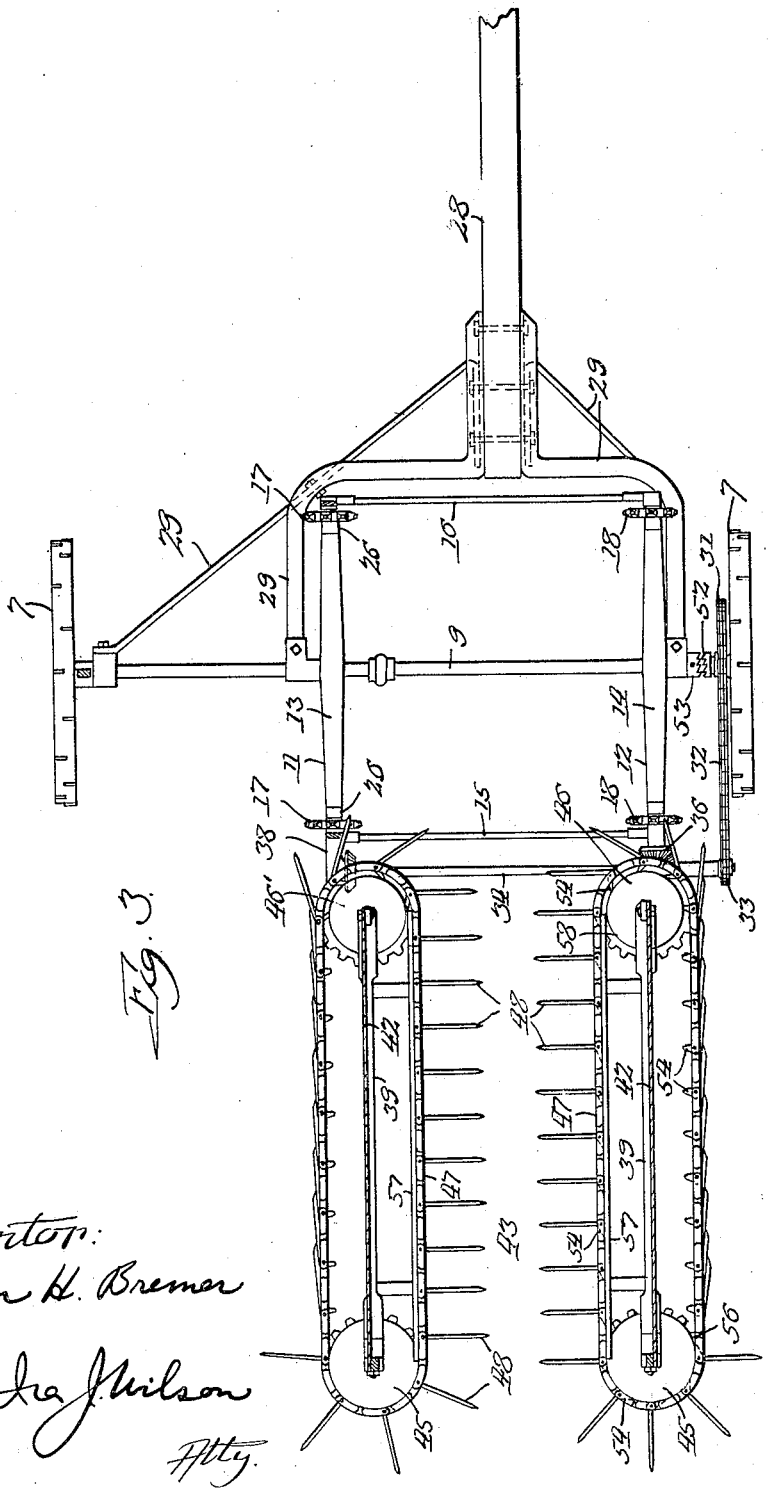

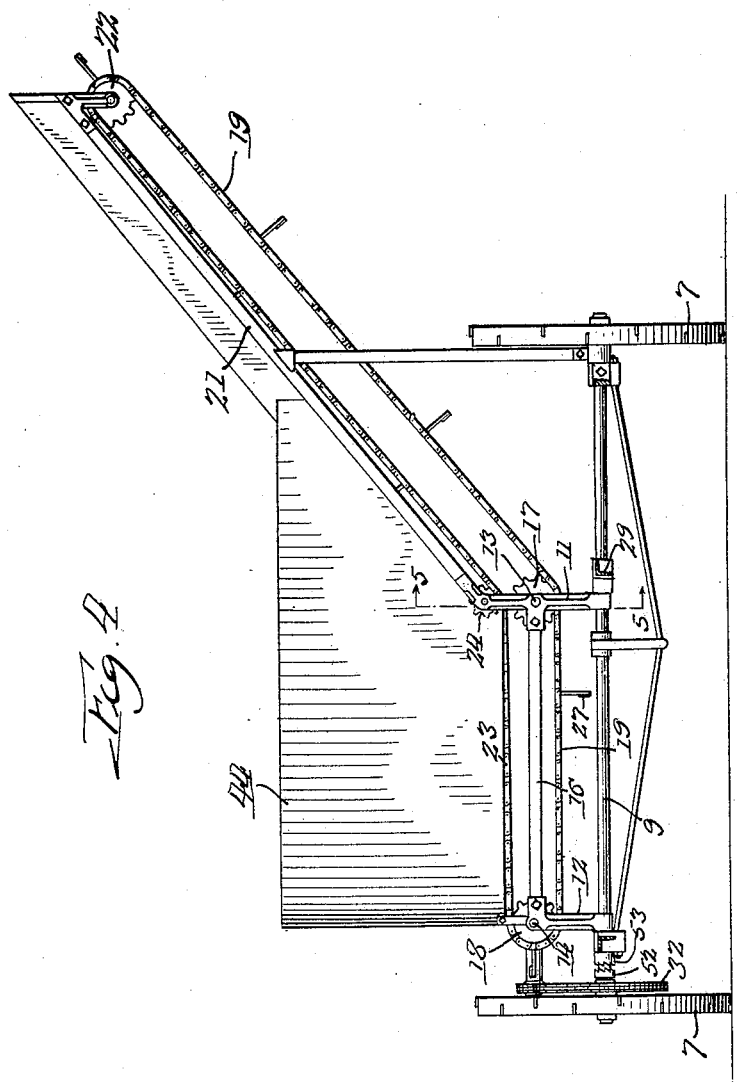

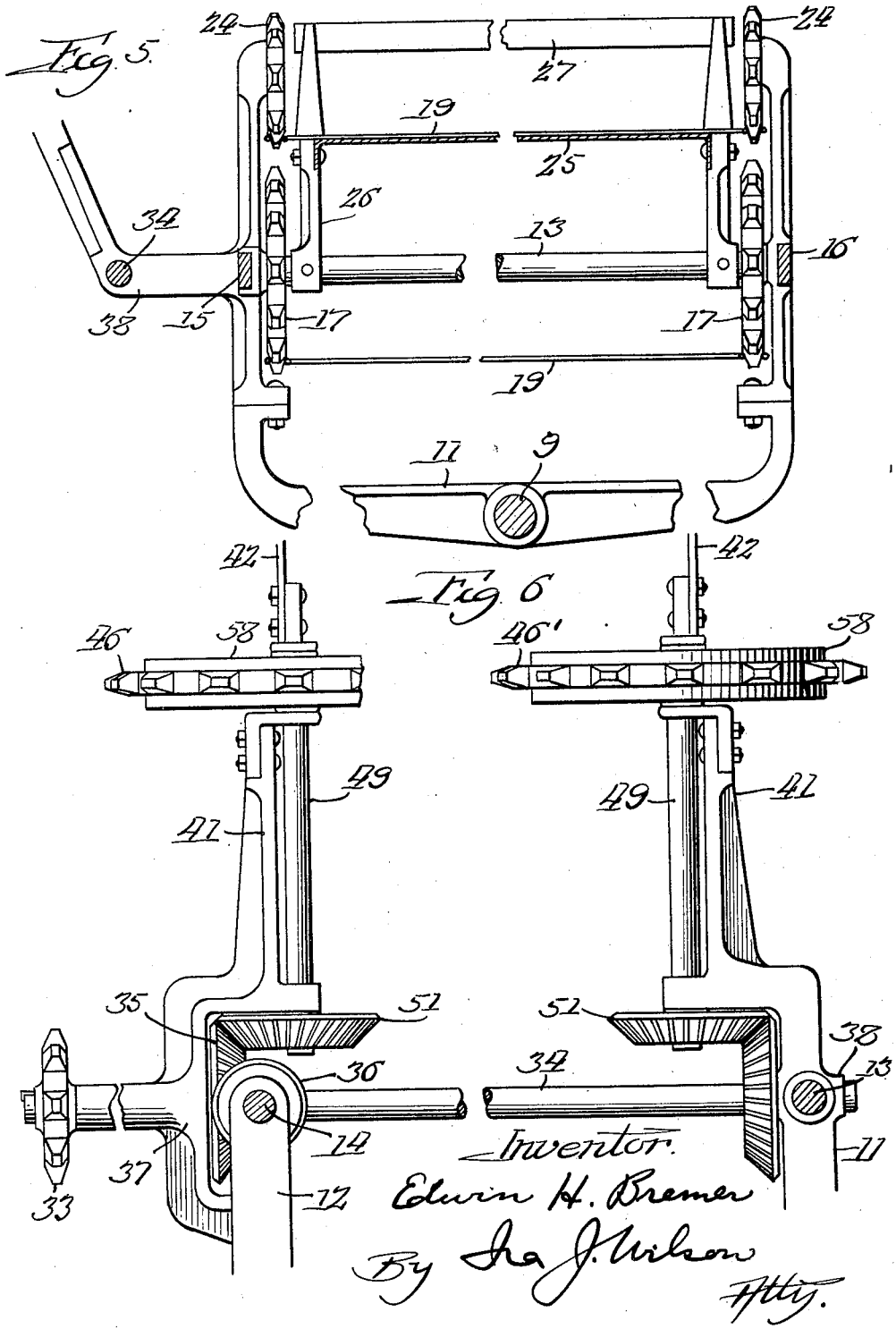

EDWIN H. BREMER, OF FREEPORT, ILLINOIS.

GRAIN-LOADER.

1,374,423.     Specification of Letters Patent.     Patented Apr. 12, 1921.

Application filed June 20, 1919. Serial No. 305,674.

*To all whom it may concern:*

Be it known that I, EDWIN H. BREMER, a citizen of the United States, residing at Freeport, in the county of Stephenson and State of Illinois, have invented certain new and useful Improvements in Grain-Loaders, of which the following is a specification.

This invention pertains to loaders especially adapted for picking up bundles or shocks of grain from the ground and delivering them onto a rack or other vehicle drawn alongside the loader.

Among the objects of my invention, I have aimed to provide a simple and novel machine for picking up bundles of grain from the ground and conveying them to an elevated point at one side of the machine at which they are delivered into a suitable conveyance. My improvements are characterized, generally stated, by the provision of a transverse conveyer and elevator, and a pick-up device of novel construction arranged in front of the conveyer and including a pair of transversely spaced endless chains arranged in an inclined plane in proximity to the ground at their forward ends and above said transverse conveyer at their rear ends and equipped peripherally with teeth adapted to penetrate the bundles, which stand in a shock, and draw them between said endless chains upwardly and deposit them on the transverse conveyer.

Another object of my invention resides in the novel construction and arrangement of the pick-up device just described, which device is designed to loosen the bundles from a shock and elevate them in a very efficient manner without breaking the bundles or clogging the machine.

I have also aimed to provide a machine of this character of generally improved construction and equipped with driving means of a very simple nature, all of which contribute to the practicability of the machine and enable production at a comparatively low cost.

Other objects and attendant advantages will be appreciated as the invention becomes better understood by reference to the following description when considered in connection with the accompanying drawings, in which—

Figure 1 is a side elevation of a loader embodying my improvements, the near drive wheel being removed;

Fig. 2, an enlarged detail view of one of the forward sprocket wheels and its mounting;

Fig. 3, a plan sectional view of the loader taken substantially on line 3—3 of Fig. 1;

Fig. 4, a rear view of the loader;

Fig. 5, an enlarged sectional view taken substantially on line 5—5 of Fig. 4; and Fig. 6, an enlarged sectional view taken substantially on line 6—6 of Fig. 1.

As shown in the drawing, my improvements in their present exemplification are embodied in a machine carried by rear drive wheels 7 and front caster wheels 8. The wheels 7 carry an axle 9 on which is mounted a main frame consisting in the present instance, of a pair of fore-and-aft extending brackets or castings designated generally by 11 and 12 shaped at their forward and rear ends to provide upright standards between and upon which are mounted fore-and-aft extending shafts 13 and 14. The side brackets 13 and 14 are rigidly joined at their front and rear ends by cross bars 15 and 16, thus effecting a rigid main frame structure. Upon the shaft 13 and intermediate the upright standards of the bracket 11 are loosely journaled sprocket wheels 17, and sprocket wheels 18 are fixed to the shaft 14 which is journaled in the upright standards of the bracket 12. Trained about these sprocket wheels in the manner indicated in Fig. 4, is an endless conveyer 19 of suitable construction. It will also be noted that a suitable inclined elevator frame structure designated generally by the character 21 supported from the bracket 11 and the axle 9, is equipped with sprocket wheels 22 at its upper end, about which the endless conveyer 19 is trained. As shown in Fig. 4, this conveyer has a horizontal upper reach 23 between the drive sprockets 18 and idler sprockets 24 which are mounted on the bracket 11 above the sprockets 17. This horizontal reach of the conveyer overlies a stationary receiving platform 25, best shown in Fig. 5, and suitably supported from the main frame, it being noted that this platform 25 is carried at the right hand side of the machine by upstanding arms 26 rigidly secured to the stationary shaft 13 at the inner sides of the sprocket wheel 17. Upon this platform, the bundles of grain or other material raised from the ground by a pick-up means which will be presently described, are adapted to be moved to the right viewing Fig. 4, by suitable cleats 27 on the endless conveyer 19, and thence along an upwardly inclined platform similar to the platform 25, to the upper end thereof. It will be noted that the upper end of this inclined elevator projects laterally beyond one side of the machine so that the material will be delivered or dropped onto a rack or wagon drawn alongside of the loader. From the foregoing, it should be understood that my invention contemplates the provision of a main frame suitably constructed to accommodate and support a transverse conveyer and elevator which has a horizontal bundle-receiving portion arranged as low as practicable, and an upwardly and laterally inclined elevator portion arranged to deliver the bundles from an elevated point onto a vehicle drawn alongside the loader.

Any suitable means may be employed for propelling the loader, and in the present instance I have equipped it with a push pole 28 suitably connected to the loader as by means of the connecting bars 29. The rear end of the push pole is preferably wheel-supported and equipped with the proper draft attachments for the horses and also with a steering attachment which may be of any suitable or preferred construction.

The transverse conveyer and elevator 19 is driven from the traction wheels 7 through the agency of a sprocket wheel 31, having a chain connection 32 with a sprocket wheel 33 fixed to a transverse shaft 34, at the inner end of which is fixed a bevel gear 35 meshing with a bevel gear 36, secured to the shaft 14, which drives the sprockets 18. The shaft 34 as noted in Figs. 3 and 6, journaled in a casting 37 rigidly connected with the main frame casting 12, extends across the machine and is journaled at its opposite end in a bracket 38 integral with the frame bracket 11. The shaft 34 in addition to driving the transverse conveyer also drives a pick-up and elevating device constructed and arranged in a novel manner, as will now be described.

This pick-up and elevating device located forwardly of the transverse conveyer is designed to pick up bundles from the ground and elevate and deliver them onto the horizontal portion of the transverse conveyer. The device is supported by a forward frame structure formed integral with the main frame and consisting of side brackets 39 supported at their forward ends by wheels of any suitable construction and rigidly connected at their rear ends to the main frame through the agency of bracket sections 14. These side frames are suitably braced and tied together at 30 by a transverse tie-bar casting and are equipped with upright side boards 42 extending fore-and-aft of the machine and defining the outer sides of an elevator way 43. The side boards 42 merge at their rear ends into a suitable casing 44 inclosing the bundle-receiving platform and the transverse carrier way. As regards this forward frame structure and the sides for the carrier ways, it should be noted that my invention contemplates the use of any suitable construction for the purpose of carrying the pick-up and elevator device in the desired coöperative relation to the transverse elevator. Each side frame 39 carries at its forward end in proximity to the ground a sprocket wheel 45, and at its rear end above the bundle-receiving platform a driving sprocket wheel 46, these sprocket wheels being mounted to revolve in an upwardly and rearwardly inclined plane. About the pair of sprocket wheels 45 and 46 at each side of the elevator way 43 is trained an endless chain 47 or suitable linked structure equipped peripherally at spaced points with outwardly extending and relatively long narrow teeth 48. As shown in Fig. 2, the sprocket wheels 45 mounted on U-bolts 40 are adapted to be adjusted to take up for wear or slack in the chains. The rear sprocket wheels 46 are mounted on shafts 49, each equipped at its lower ends with a bevel gear 51 meshing, as shown in Fig. 6, with a gear fixed to the shaft 34. It will be noted that the gears 51 are driven from the outer side so that when the shaft 34 is revolved in a counter-clockwise direction viewing Fig. 1, by forward travel of the loader, the sprocket wheel 46 will be revolved in a clockwise direction and the sprocket wheel 46′ in a counter-clockwise direction, thus causing the inner reaches of the endless chains 47 to travel upwardly and rearwardly in unison. A suitable clutch is interposed in the drive for disconnecting the transverse conveyer and the pick-up devices from the driving wheels when the machine is not in use, and simply being transported. This clutch, in the present instance, is interposed between the driving sprocket 31 and the axle 9, the sprocket 31 being splined on the axle and equipped with clutch teeth 52 adapted to be engaged with the clutch element 53 fixed to the axle, any suitable shifting means (not shown) being employed for shifting the clutch element 52 into and out of engagement with the clutch element 53.

The teeth 48 on each pick-up conveyer and elevator are so mounted that they may be swung into and out of operative position; and my invention contemplates the provision of suitable means for automatically actuating these teeth to secure a most effective pick-up action and also deliver the bundles onto the transverse conveyer. As an illustration of this operation, each tooth 48 is pivotally mounted and equipped with a cam follower portion 54 adapted to be actuated by certain parts presently mentioned, for governing the position of its respective tooth. As the teeth are carried about the wheel 45, the portions 54 come in contact with the periphery 56 of said wheel which holds the teeth in a rigid radial position, so that as they travel inwardly they will penetrate the bundles in the path of the loader and draw them into the elevator way 43. When the teeth leave the wheel 45, the portions 54 will be carried upon a stationary track 57, which also serves to hold the endless chain in working position. The tracks 57 thus control the position of the teeth during the elevating movement, and the bundles interposed between and carried by the teeth of both pick-up devices will be compressed between the same and securely held and carried upwardly. When the teeth reach the wheels 46 and 46', they will be given a retracting movement by reason of the annular periphery or shoulder 58 being of less diameter than that of the periphery 56, thereby permitting the teeth to assume a retracted or tangentially disposed position at the end of the elevating stroke. Thus, as the bundles are delivered onto the transverse conveyer the teeth will be withdrawn from the bundles in such manner as to allow a free rearward delivery without throwing the bundles outwardly as would be the case if the teeth retained their rigid radial position. On the forward idle travel of the teeth they assume a fully retracted position, and when carried onto the wheel 45 they will again assume the radial position as described above.

My invention contemplates driving the pick-up devices at such speed that the teeth have a lineal travel of substantially twice that of the forward travel of the loader. This permits of relatively large capacity loading with mechanism of relatively simple construction, for it will be observed that when the loader is driven centrally into a shock the pick-up device will loosen the bundles and carry them inwardly quite rapidly in such manner as not to break the bundles, but draw them into the carrier way and elevate them rearwardly faster than the forward motion of the loader. As a result of this operation, an entire shock of ordinary size may be completely loaded as the machine travels forward, the bundles being literally pulled into the carrier way in a standing position and supported from both sides and retained in this position until delivered onto the transverse conveyer. The bundles will be thrown onto this conveyer on their sides and delivered onto the rack or wagon at the side of the loader as described above.

It is believed that the foregoing conveys a clear understanding of the mode of operation and principles of my invention and of the objects prefaced above, and while I have illustrated but a single embodiment thereof, it should be understood that various changes might be made in the construction and arrangement without departing from the spirit and scope of the invention as expressed in the appended claims:

I claim:

1. A bundle carrier of the character described comprising a pair of drive wheels, an axle supported thereby, a pair of front caster wheels, a frame supported by the drive and caster wheels, an endless transverse conveyer centrally above the axle and having a horizontal bundle-receiving portion and an inclined elevator portion, a transverse shaft on the frame in front of said conveyer, driving connections between one of the drive wheels and said shaft and between the latter and the conveyer, forward and rear pairs of laterally spaced sprocket wheels on the forward portion of the frame on inclined axes, endless bundle pick-up devices trained above said sprocket wheels and adapted to elevate bundles and deposit them on the horizontal bundle-receiving portion of the transverse conveyer, and driving connections between the rear sprocket wheels and said transverse shaft.

2. A bundle loader of the character described, comprising a pair of drive wheels, an axle supported thereby, a pair of laterally spaced brackets journaled on said axle and each supporting a fore-and-aft conveyer shaft above the axle, and a transverse horizontal conveyer trained over said shafts and inclined upwardly at one end providing an elevator, a transverse shaft driven from one of the drive wheels and in driving connection with one of the fore-and-aft shafts, and bundle pick-up mechanism at the front of said transverse conveyer for picking up bundles and depositing them on the horizontal portion of the conveyer.

3. A bundle loader of the character described, comprising a pair of drive wheels and front caster wheels, a frame carried by said wheels, and a transverse horizontal conveyer mounted on the frame between the drive wheels and inclined upwardly at one end substantially above and beyond the drive wheel at the adjacent side of the loader providing an elevator.

4. A bundle loader of the character described, comprising a pair of drive wheels and front caster wheels, a frame carried by said wheels, a transverse horizontal conveyer mounted on the frame between the drive wheels and inclined upwardly at one end substantially above and beyond the drive wheel at the adjacent side of the loader providing an elevator, a pick-up device on the forward portion of the frame for picking up bundles and depositing them on the horizontal portion of the conveyer, and a push bar structure wheel-supported at its rear end and pivotally connected with the frame for pushing the loader.

5. A loader of the character described, comprising a pair of drive wheels, a front pair of caster wheels, a ratchet frame carried by said wheels, a horizontal transverse conveyer intermediate the drive wheels and in proximity to the axis thereof and inclined at one end upwardly above and beyond the drive wheel at the adjacent side of the loader providing an elevator, a transverse shaft on the frame driven by one of the drive wheels and in driving connection with the conveyer, a pair of forward laterally spaced sprocket wheels in proximity to said caster wheels, a pair of rear laterally spaced sprocket wheels, a pick-up device trained above the sprocket wheels at each side of the frame, and a driving connection between each rear sprocket wheel and said transverse shaft.

EDWIN H. BREMER.